United States Patent
Lannes

[11] Patent Number: 5,988,117
[45] Date of Patent: Nov. 23, 1999

[54] TOP INLET FOR A WATER HEATER

[76] Inventor: Eric M. Lannes, 2158 Wolfboro Dr., SE., Kentwood, Mich. 49508

[21] Appl. No.: 08/865,051

[22] Filed: May 29, 1997

[51] Int. Cl.[6] ..................................................... F22B 37/48
[52] U.S. Cl. .......................... 122/383; 122/159; 122/382; 122/405
[58] Field of Search ........................... 122/13.1, 17, 159, 122/382, 383, 390, 405

[56] References Cited

U.S. PATENT DOCUMENTS

| | | |
|---|---|---|
| 241,360 | 5/1881 | Hayes et al. . |
| 349,046 | 9/1886 | Hooker . |
| 1,790,357 | 1/1931 | Stack . |
| 2,123,809 | 7/1938 | Seitz . |
| 2,592,863 | 4/1952 | Conner . |
| 2,602,465 | 7/1952 | Goehring . |
| 2,766,200 | 10/1956 | Kaufman . |
| 2,825,464 | 3/1958 | Mack . |
| 3,229,683 | 1/1966 | Russell et al. . |
| 3,465,123 | 9/1969 | Harris . |
| 3,762,395 | 10/1973 | Taylor . |
| 4,157,077 | 6/1979 | Lindahl . |
| 4,216,092 | 8/1980 | Shalhoob et al. . |
| 4,257,355 | 3/1981 | Cook . |
| 4,263,879 | 4/1981 | Lindahl . |
| 4,505,231 | 3/1985 | Syler . |
| 4,512,289 | 4/1985 | Collins . |
| 4,549,525 | 10/1985 | Narang . |
| 4,662,314 | 5/1987 | Moore, Jr. . |
| 4,714,053 | 12/1987 | Perry . |
| 4,735,174 | 4/1988 | Crump . |
| 4,790,289 | 12/1988 | Barrett . |
| 4,790,291 | 12/1988 | Barrett . |
| 4,813,383 | 3/1989 | Daugirda . |
| 4,817,564 | 4/1989 | Akkala et al. . |
| 4,838,211 | 6/1989 | Vago . |
| 4,858,563 | 8/1989 | Perry . |
| 4,870,927 | 10/1989 | Sundheimer . |
| 4,898,124 | 2/1990 | Granberg et al. . |
| 4,898,150 | 2/1990 | Lewis . |
| 4,905,900 | 3/1990 | Scharton et al. . |
| 4,911,108 | 3/1990 | Akkala et al. . |
| 4,949,680 | 8/1990 | Kale . |
| 4,951,614 | 8/1990 | Akkala et al. . |
| 4,964,394 | 10/1990 | Threatt . |
| 4,972,804 | 11/1990 | Stolmar . |
| 5,152,843 | 10/1992 | McDonald et al. . |
| 5,169,180 | 12/1992 | Villoni et al. .............................. 285/53 |
| 5,341,770 | 8/1994 | Lannes . |
| 5,365,891 | 11/1994 | Hanning . |

FOREIGN PATENT DOCUMENTS

| | | |
|---|---|---|
| 17117/76 | 5/1979 | Australia . |
| 132112 | 1/1985 | European Pat. Off. . |
| 2183339 | 12/1973 | France . |
| 90 07 155.7 | 8/1990 | Germany . |

Primary Examiner—Teresa Walberg
Assistant Examiner—Gregory A. Wilson

[57] ABSTRACT

An inlet is provided for delivering water into a water heater through a port in its top. The inlet includes a conduit having a distal portion that extends downwardly toward a bottom of the water heater. The inlet includes means for deflecting the water flow through openings in the inlet's wall in order to reduce the generation of temperature gradients that otherwise tend to develop within water heater tanks. A water heater assembly including such an inlet is also described.

18 Claims, 3 Drawing Sheets

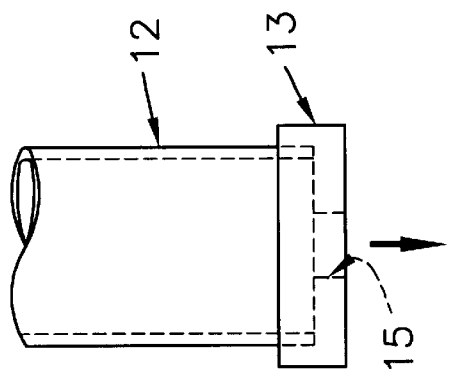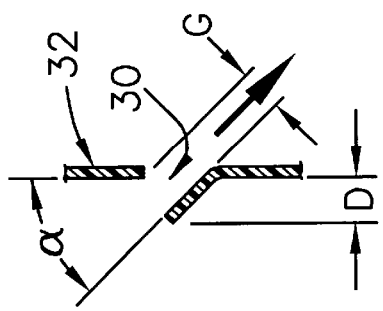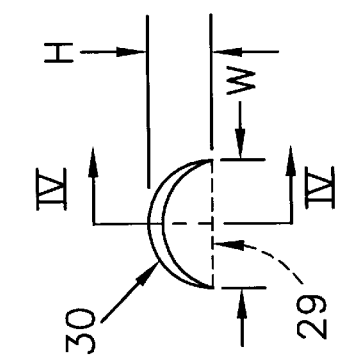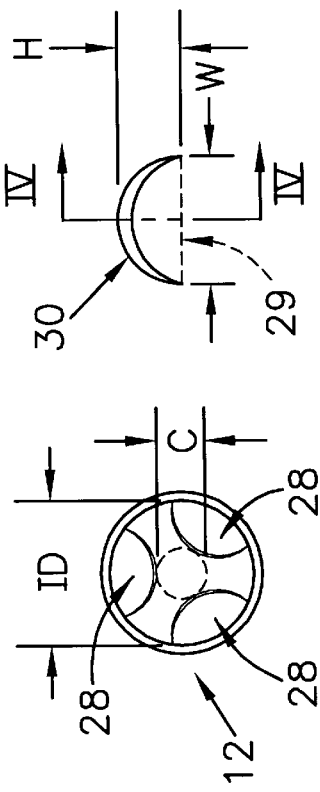

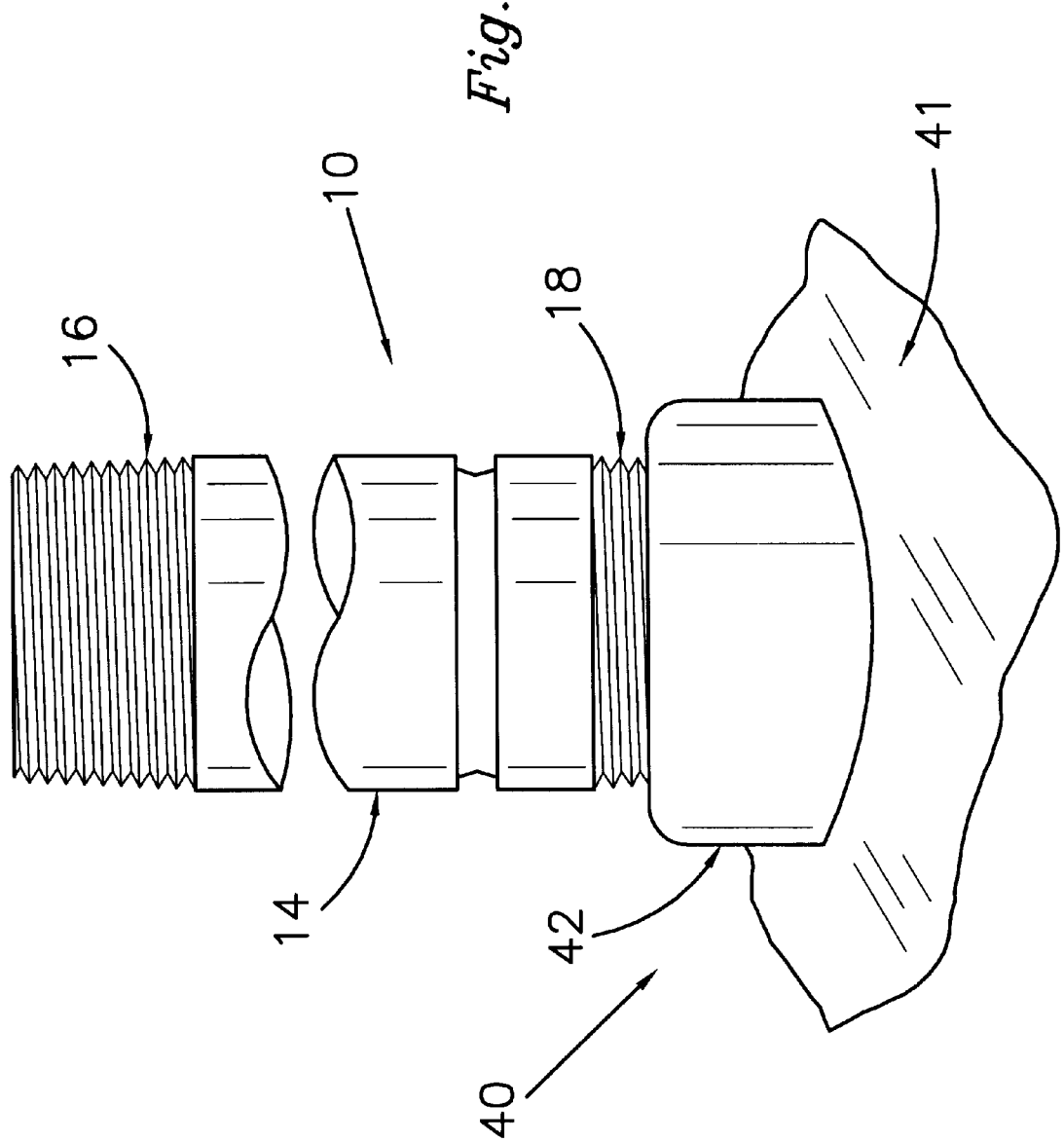

TOP INLET FOR A WATER HEATER

BACKGROUND OF THE INVENTION

This invention relates to an inlet for a water heater and particularly to a top inlet adapted to reduce the generation of temperature gradients within the water heater.

FIELD OF THE INVENTION

The generation of temperature gradients in water heaters above the desired outlet temperature represents a serious problem. Heating of water promotes the precipitation of sediment, and excessive temperature gradients tend to accelerate sediment precipitation. Accumulated sediment tends to harden, forming a scale on various tank surfaces, which reduces water heater efficiency and, in many cases, can lead to failure.

Also, excessive temperature gradients tend to cause excessive temperature fluctuations. Such fluctuations bring about undue fatigue of the water heater tank and can reduce water heater longevity.

Furthermore, excessive temperature gradients within the water heater's tank can tend to reduce the draw-off ability of the water heater and can decrease the water heater's response time. Both of these conditions compromise water heater efficiency.

Various top inlets have been introduced over the years in an attempt to overcome one or more of these problems. U.S. Pat. No. 5,341,770, issued to Eric M. Lannes, incorporated herein by reference, describes a cold water inlet conduit having a passage for water flow and deflecting means to create turbulent water flow within the conduit and to introduce turbulent water into a water storage tank. It is available from Bradford White Corporation of Ambler, Pennsylvania under the trademark HYDROJET®. Despite the significant benefits of the HYDROJET inlet, there remains a demand for improved top inlets.

OBJECTS OF THE INVENTION

It is an object of the invention to provide a top inlet adapted to reduce the generation of temperature gradients that tend to develop in water heater tanks.

It is another object of the invention to provide a top inlet adapted to increase water heater efficiency.

It is yet another object of the invention to provide a cost effective top inlet that is easy to install.

Other objects of the invention will become clear from the drawings and descriptions that follow.

BRIEF DESCRIPTION OF THE DRAWINGS

FIG. 2 is an end view of the top inlet shown in FIG. 1.

FIG. 3 is a side view of a portion of the top inlet shown in FIG. 1.

FIG. 4 is a cross-sectional side view of a detail of the top inlet shown in FIG. 3.

FIG. 5 is a side view of another embodiment of a top inlet according to this invention.

FIG. 6 is a side view of an embodiment of a water heater comprising the top inlet shown in FIG. 1 or FIG. 5.

SUMMARY OF THE INVENTION

Figure 1:
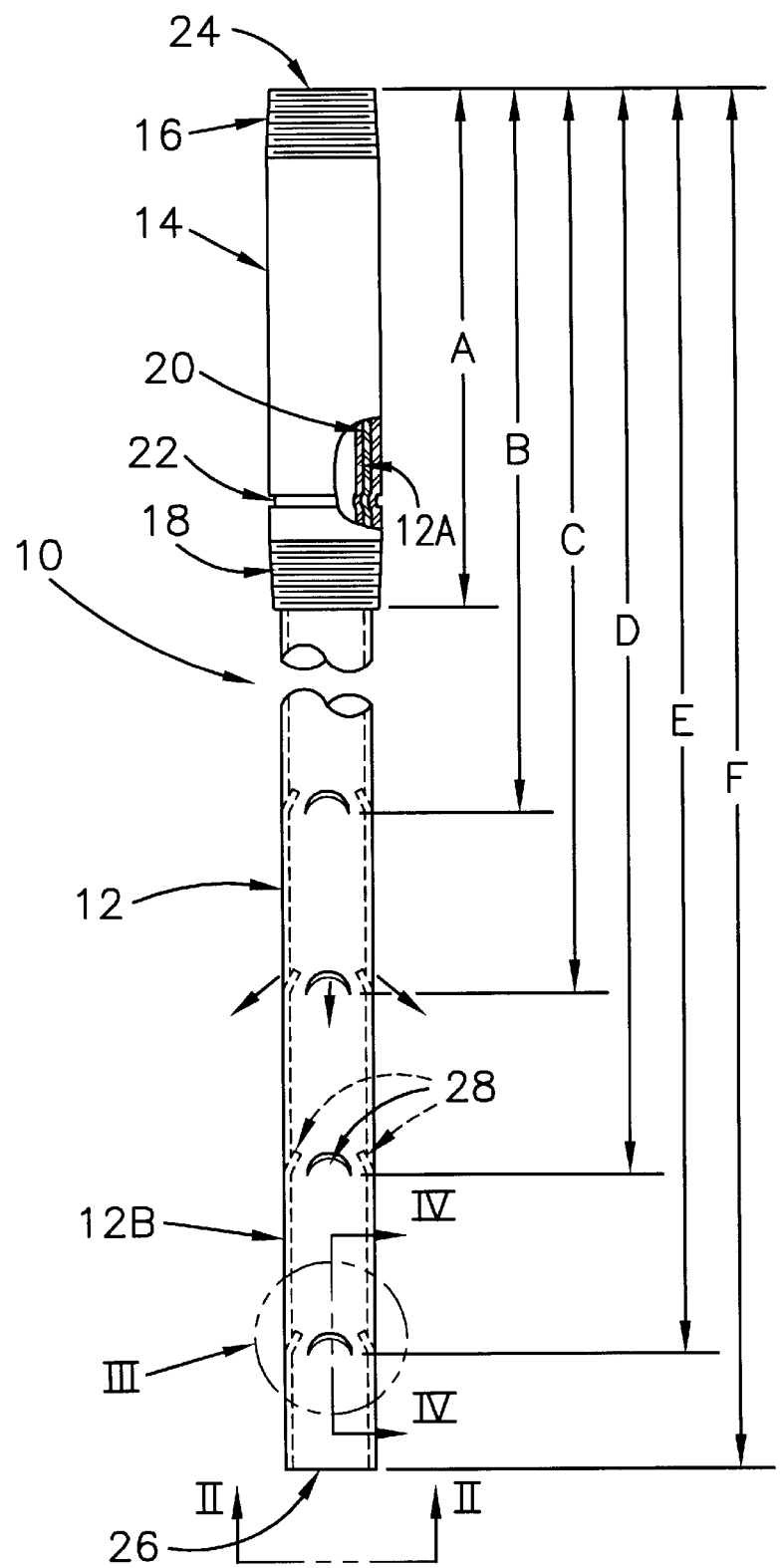
FIG. 1 is a side view of an embodiment of a top inlet according to this invention.

This invention relates to an inlet adapted for delivering water into a water heater tank through a top port. The inlet includes a conduit having a proximal portion with a flow opening for water flow into the inlet from a water source. The conduit extends from the proximal portion downwardly to a distal end portion, which includes a flow opening for water flow from the conduit into the tank. The conduit defines a longitudinal flow passage. A plurality of wall openings is provided for radial flow from the flow passage. Means such as a deflector is provided within the conduit adjacent to each of the wall openings. They extend into the flow passage for deflecting at least a portion of the water flow radially outwardly through the wall openings.

Upon installation of the inlet into the water heater tank, the proximal portion of the conduit extends through the tank's top port and the distal end portion extends downward toward a bottom surface of the tank. As water flows into the tank, the wall openings and the deflecting means co-act to reduce the generation of temperature gradients in the tank.

This invention also relates to a water heater that is capable of reducing the generation of such temperature gradients. It includes an inlet conduit, as described, as well as a fitting for engaging the inlet conduit to the tank's top port.

DETAILED DESCRIPTION OF THE INVENTION

The following description is intended to refer to specific embodiments of the invention illustrated in the drawings. While a specific configuration has been selected for illustration, the flow pattern of incoming water is highly effective with various modifications. This description is not intended to define or limit the scope of the invention, which is defined separately in the claims that follow. Also, it will be appreciated that the drawings are not necessarily to scale and are merely provided for the purpose of illustration.

Generally speaking, the invention relates to an inlet adapted for delivering cold water into the storage tank of a water heater through a top port. Although the invention has been discovered to be highly beneficial for use in gas-fired water heaters that are intended for commercial use, the inlet is highly effective in electric, oil-fired and any other type of residential or commercial water heater.

The inlet includes a conduit that is sized and shaped to be installed through the top port of a water heater. It has a proximal portion that is to be connected to the tank's top port by means of a fitting. Extending from the proximal portion is a distal portion that terminates at a flow opening for introducing water from the conduit and into the tank's interior.

Upon installation of the inlet into the water heater's tank, the proximal portion of the inlet conduit preferably extends through the tank's top port. The conduit extends downwardly from the proximal portion, preferably along a vertical axis. The distal portion preferably extends downwardly toward a bottom of the tank and terminates at an end opening that is most preferably positioned adjacent to the tank's bottom surface.

The inlet conduit is preferably provided with a substantially tubular shape with a substantially constant cross-sectional area for the flow passage that extends through the proximal and distal portions. The flow opening is optionally reduced or constricted. The preferred inlet conduit defines a substantially continuous flow passageway extending from a proximal end outside the tank to a distal end oriented toward the tank's bottom.

A plurality of wall openings are provided in the wall of the conduit at locations between the proximal and distal ends of the conduit, preferably closer to the distal end. The wall openings provide passages for flow from the longitudinal flow passageway in the conduit radially outwardly into the tank's interior.

A means, such as one or more flow deflectors or an equivalent structure, is connected within the inlet conduit adjacent to each of the wall openings. The means is positioned to extend into the water flow path in order to deflect the water flow as it travels through the inlet conduit radially outwardly through an adjacent wall opening toward the tank's interior. In a preferred embodiment, the means for deflecting the water flow includes an angled surface positioned adjacent to the conduit's wall and extending within the conduit into the water flow path. The means can be any deflector or element that redirects the water flow as it passes through the conduit toward the tank's interior. Most preferably, it takes the form of a tab that is connected in the conduit's wall and that extends toward the central axis of the conduit. Such a preferred tab is located adjacent to a hole in the conduit's wall, perhaps a hole created by forming the tab. Most preferably such a tab is positioned just downstream from the wall opening. Although the means for deflecting the water flow is preferably integral with the inlet conduit or the wall thereof, it can be formed from a separate component that is attached to the conduit by a fastener, snap-in or press-fit engagement, weld, threads, or any other known or equivalent fastening means.

A threaded fitting is preferably used to connect the inlet conduit to the tank's top port. In a preferred embodiment, a threaded fitting is engaged over the proximal portion of the inlet conduit so that it can be threaded into a spud attached to the water heater tank's top. The fitting is preferably engaged to the inlet conduit so that longitudinal movement of the inlet conduit through the fitting is prevented. In a preferred structure, this is accomplished by forming a ring-type groove in the outer surface of the fitting in order to create a radially inwardly extending surface within the fitting that can capture the conduit. It is this ring groove that prevents such longitudinal movement.

Although the deflecting means and wall openings are preferably positioned along the conduit so that the orientation of the conduit about its longitudinal axis is not critical for optimal performance, the ring groove can be adapted to permit rotation of the inlet conduit even after the inlet is installed in the water heater. Accordingly, a means is preferably provided for rotating the conduit in the fitting to adjust the conduit's orientation. The means may include a recess, such as a slot for example, or any surface positioned near or at the proximal end of the conduit. Engagement of such a surface facilitates the conduit's rotation after the fitting is threaded into the spud. A visual indicator is preferably provided to indicate the orientation of the conduit from outside of the tank.

In an optional feature of the invention, the proximal end of the inlet conduit extends outwardly beyond the proximal end of the fitting. This feature provides unobstructed access to the proximal end of the conduit for rotational adjustment. Also, when a source of cold water is connected to the proximal end of the fitting to make the necessary connection, the proximal end of the inlet conduit can extend outwardly beyond the end of the fitting. It has been discovered that water flow from the source into the inlet is directed toward the central interior region of the inlet. Such flow reduces the wear and erosion that can otherwise be caused when flowing water directly impacts against the fitting. Instead, a buffer of slow-moving water is trapped adjacent to the fitting's end. Such an optional feature may be especially desirable when dielectric insulation is positioned between the fitting and the conduit. The optional extension of the conduit beyond the fitting's end prevents accelerated erosion of the dielectric insulation.

Referring to FIGS. 1–4, a preferred embodiment of an inlet according to this invention, designated by the numeral "10", will now be described. FIG. 1 shows a side view of inlet 10 having an inlet conduit 12 with a proximal portion 12A and a distal portion 12B that extends to the end of the inlet conduit. Together, portions 12A and 12B define a continuous flow passageway with a tubular cross-section, although other cross-sections are contemplated as well. In this embodiment, portions 12A and 12B share the same axis, and portion 12B is substantially an extension of portion 12A. The inlet conduit can be formed from plastic or metal, as desired.

Engaging the proximal portion 12A of the conduit is a fitting 14 that is preferably formed from a metal such as steel. Fitting 14 includes male pipe threads 16 and 18 at each end. Pipe thread 16 is used for water-tight connection to a source of cold inlet water (not shown). Pipe thread 18 is intended for threaded engagement of fitting 14 into the spud of a water heater's storage tank (not shown in FIG. 1). Within fitting 14, and captured between fitting 14 and the inlet conduit, is a dielectric insulator 20, preferably in the form of an insulating polymeric tube. Dielectric insulator 20 provides dielectric isolation between the metallic fitting 14 and the inlet conduit.

A ring-type groove 22 is formed in the outer surface of fitting 14 by known manufacturing methods. The groove 22 provides the interior surface of fitting 14 with a radially inwardly extending surface that captures dielectric insulator 20 as well as proximal portion 12A of the inlet conduit. A ring groove is preferably used to serve this purpose because it prevents longitudinal movement of the inlet conduit through fitting 14, along its axis. At the same time, groove 22 can be adapted to permit rotational movement of the inlet conduit with respect to the fitting 14 so that their relative positions can be adjusted, if desired. A proximal end 24 of the inlet conduit optionally extends outwardly beyond the proximal end of the fitting 14 in the preferred embodiment for the reasons set forth in the general description of the invention. Although not shown, the proximal end of the inlet conduit preferably includes a pair of slots, or some other equivalent recess or surface, in order to facilitate rotation of the conduit within the fitting 14. A tool can be positioned across such slots and rotated until a desired position is obtained, if necessary. The slots themselves, or a separate indicator such as an arrow or other indicia, can act to signify the orientation of the conduit with respect to the fitting and tank.

At the other end of the inlet conduit, an opening 26 is provided at the downstream end of distal portion 12B. In this preferred embodiment, opening 26 occupies a plane that is substantially horizontal and normal to the longitudinal axis of portions 12A and 12B. The opening 26 extends entirely across the distal portion 12B and, when viewed from the bottom (FIG. 2), it has a cross-sectional area as large as the cross-sectional area of the flow passageway through the inlet conduit.

One possible form of a deflector or deflecting means is designated with the numeral "28", although many other possible forms and configurations are contemplated. In this embodiment, a plurality of deflectors or tabs 28 are integrally connected to the interior surface along distal portion 12B of the inlet conduit. Tabs 28 extend inwardly toward the central region of the flow passageway in order to deflect the water flow through adjacent wall openings 30 that are located just upstream of corresponding deflectors. The tabs 28 cooperate with the inlet conduit to reduce the generation of temperature gradients within the water heater.

Further details of a preferred tab 28 will now be described with reference to FIGS. 2, 3 and 4. Tab 28, in this embodiment, takes the form of an integral, semi-circular tab that is cut into the wall of the inlet conduit and bent along a fold line 29 (FIG. 3) in a direction toward the conduit's central axis. In so doing, the corresponding opening 30 is created in the conduit's wall adjacent to and upstream of tab 28. It is important to note that tab 28 can be formed in a wide variety of manners. In fact, deflector 28 can be formed as an entirely separate component that can be attached to, or mounted within, the distal portion 12B of the inlet conduit.

As shown in FIG. 4, which provides a cross-sectional view of a portion of a wall 32 in the distal portion 12B, the tab 28 extends into the flow path at an angle such as angle "α". The distance it extends into the flow path is designated by the letter "D" in FIG. 4, and the size of the gap or opening 30 adjacent to the tab 28 is indicated by the letter "G". Angle α is preferably an acute angle in order to best deflect the water flow out through the wall openings.

Although only one deflector means arrangement is illustrated in the embodiment shown in the Figures, it is of course contemplated that a wide variety of arrangements can be used and that deflecting means can be positioned in a variety of locations and orientations.

Referring again to FIG. 1, the preferred embodiment of inlet 10 includes a series of tabs 28 positioned in four planes separated along the length of distal portion 12B. Three tabs 28 are preferably provided in each of the four planes. Referring to FIG. 2, deflectors 28 extend inwardly and upwardly toward the central axis of the longitudinal flow passageway. In this embodiment, tabs 28 extend inwardly from the wall 32 of inlet conduit 12 from its inside diameter ID. Shown in dotted lines is a central region C of unobstructed flow through the plane of tabs 28. Central region C can vary in diameter from zero or near zero to a diameter corresponding to the inside diameter of the inlet. However, central region C is preferably limited in diameter so that significant flow is directed through the wall openings. Most preferably, the cross-section area of central region C is substantially less than the cross-sectional area of inside diameter ID. For example, each tab 28 most preferably blocks between about 10% and 50% of the flow path, although smaller and larger tabs are contemplated as well.

In operation, as water flows downwardly through the flow passageway, a portion of the water flow impinges against tabs 28 and is swept radially outwardly in the general direction indicated by the arrows in FIGS. 1 and 4. The rest of the water flow that remains in the flow passageway exits inlet conduit 12 through end opening 26 toward the bottom of the tank. Accordingly, water flows out through each of the wall openings 30 (by action of the adjacent tabs 28) and through end opening 26. This preferred flow pattern is capable of reducing the generation of temperature gradients within the water heater's tank.

Referring now to FIG. 3, each tab 28 has a width W and a height H, which also corresponds to the dimensions of the adjacent wall opening 30 in this embodiment. Together, width W and height H define the surface area of the deflector, which can be adjusted depending on factors such as the number of deflectors used, the relative position of the deflectors, the inside diameter ID of the inlet conduit 12 (FIG. 2), the capacity and diameter of the water heater's tank, and the position of the deflector along the length of inlet conduit 12.

Inlet conduit 12 is especially well adapted for use in commercial water heaters and, accordingly, may have an inside diameter as large as about 1¼" or larger. For this reason, tabs 28 should be large enough to "pull" or redirect a significant portion of the water flow out from the flow passageway. In order to encourage such flow, inlet 12 is optionally provided with a constriction such as the plug 13 shown in FIG. 5 in order to form a reduced flow opening 15 for flow into the tank. Such a reduced opening increases the pressure in the inlet conduit 12 to encourage maximum flow through tabs 28.

Referring now to FIG. 6, a portion of a water heater 40 is illustrated with an inlet according to this invention as a component thereof. Water heater 40 includes an inlet spud 42 with female pipe threads (not shown) positioned on a top surface 41. Male pipe threads 18 of fitting 14 are threaded into spud 42 in the usual manner until inlet 10 is sealingly engaged to the water heater 40. In order to install inlet 10, a pipe wrench or other tool can be used to rotate fitting 14 with respect to spud 42 to engage the threads. When the desired water-tight seal is created between the fitting and the spud, the orientation of the inlet conduit can then be adjusted (if necessary). Thereafter, the source of cold inlet water (not shown) can be connected to the male threads 16 on the proximal end portion of fitting 14. The inlet is then ready for use in operation.

The following Examples illustrate the significant benefits of an inlet according to this invention. The Examples are provided for illustrative purposes only, and they are not intended to limit the invention in any way.

EXAMPLE 1

An inlet such as the one illustrated in FIG. 1 was constructed and tested in commercial water heaters heated by gas-fired burners. The inlet was tested in comparison to a conventional top inlet that comprised a dip tube connected to the tank spud. The relative inlet performances were measured in relation to so-called "stacking" or "build-up". The stacking effect is described in U.S. Pat. No. 5,341,770, incorporated herein.

In this test, each water heater was allowed to heat up to a predetermined storage tank temperature of 180° F. Immediately after the main burner turned off, water was drawn off at a rate of 5 gallons per minute. The draw continued until the heater's thermostat called for heat (the main burner turned on). This cycle was repeated continuously until the measured outlet water temperature did not vary by more than 1° F. for three consecutive draws. The test results are summarized in the following

TABLE 1

| Water Heater Capacity (gallons) | Input (BTUs) | Max. Temp. (° F.) (conventional inlet) | Temp. Gradient above 180° F. (° F.) (conventional inlet) | Max. Temp. (° F.) (FIG. 1 inlet) | Temp. Gradient above 180° F. (° F.) (FIG. 1 inlet) | Decrease in Temp. Gradient (%) |
|---|---|---|---|---|---|---|
| 100 | 88,000  | 200 | 20 | 196 | 16 | 20 |
| 100 | 250,000 | 206 | 26 | 198 | 18 | 31 |
| 80  | 250,000 | 204 | 24 | 194 | 14 | 42 |

The tests revealed that the temperature gradient resulting from stacking was reduced by replacing a conventional top inlet with the inlet embodiment shown in FIG. 1. The temperature gradient above the 180° F. starting point was reduced by as much as 42%. Such reduced temperature stratification is expected to reduce lime precipitation, lengthen the life of the water heater, and reduce or even eliminate the need for periodic cleaning to remove precipitated sediment.

EXAMPLE 2

An inlet such as the one illustrated in FIG. 1 was tested in commercial storage-type water heaters. The inlet was tested in comparison to a conventional top inlet, as in Example 1, to measure relative inlet performance in relation to so-called "draw-off ability", which is the ability of the storage water heater to deliver as much water as possible before the water's outlet temperature drops below a predetermined temperature.

In this test, each storage water heater was allowed to heat up to a predetermined storage tank temperature of 180° F. Once the burners turned off, they were disconnected from the water heater's thermostat. Water was then drawn off at a rate of about 5 gallons per minute and the temperature of the outlet water was measured along with its volume. The draw was continued until the outlet temperature dropped to about 150° F. The test results are summarized in the following Table 2.

The tests revealed that the drawn-off volume before reaching 150° F. was increased by replacing a conventional top inlet with the inlet embodiment shown in FIG. 1. The drawn-off volume was increased by as much as 7 gallons (10%). Accordingly, more hot water is available during a draw and hot water is available for a longer period of time. Also, the increase in the drawn-off volume is expected to reduce temperature spikes at the delivery point and reduce the amount of work required for any external equipment such as booster water heaters.

EXAMPLE 3

An inlet such as the one illustrated in FIG. 1 was further tested in commercial water heaters in relation to so-called "burner on time". The amount of elapsed time was to measured between burner shut-off and actuation of the thermostat to call for heat. The test was similar to the test described in Example 2 except, instead of measuring the water temperature, the time until the thermostat calls for heat was measured. The results of this test are summarized in Table 3.

TABLE 2

| Storage Water Heater Capacity (gallons) | Input (BTUs) | Drawn-off Volume (gallons) (conventional inlet) | Drawn-off Volume (gallons) (FIG. 1 inlet) | Volumetric Increase (%) |
|---|---|---|---|---|
| 75  | 160,000 | 63  | 65  | 3 |
| 80  | 250,000 | 64  | 66  | 3 |
| 100 | 250,000 | 108 | 112 | 4 |
| 100 | 300,000 | 69  | 76  | 10 |

TABLE 3

| Water Heater Storage Capacity (gallons) | Input (BTUs) | Elapsed Time (seconds) (conventional inlet) | Elapsed Time (seconds) (FIG. 1 inlet) | Time Increase (%) |
|---|---|---|---|---|
| 80  | 250,000 | 124 | 128 | 3 |
| 100 | 250,000 | 127 | 129 | 2 |
| 100 | 300,000 | 185 | 215 | 16 |
| 100 | 88,000  | 174 | 187 | 7 |

This test revealed that the amount of time in between the point when the burners are turned off and the point when the thermostat later calls for heat was significantly increased by replacing a conventional top inlet with the inlet embodiment shown in FIG. 1. The time was increased by as much as 30 seconds (16%), which is expected to reduce thermostat cycling and tank fatigue.

The exact reason for these significant benefits is not certain. Nevertheless, it is speculated that the openings in the wall of the inlet conduit, together with the utilization of means for deflecting the water flow path through the openings, creates an extremely beneficial flow pattern. In the preferred configuration, it creates a number of streams that are directed out to the side of the conduit and downwardly at an angle as the water enters the interior of the tank. It is believed that such a flow pattern creates a thermal balance within the storage tank and enables a more rapid equilibrium between any stratified layers. Accordingly, the water temperature differential from side-to-side and from top-to-bottom within the tank is lower as compared to results from traditional open end or closed end inlet supply tubes. It is also speculated that the wall openings and deflecting means tend to distribute turbulent flow that may exist in the conduit into the tank while creating a vertical circular flow pattern. With such a pattern, the inlet encourages water circulation throughout the water heater's tank and reduces the temperature gradients that tend to be generated in such tanks.

Also, when used with a burner-heated system with higher input and perhaps multiple flue tubes, the inlet according to this invention reduces short cycling of the burner and causes it to fire for a longer period of time. This has been discovered to enable better polarization for the cathode, reduce the amount of stress at the weld between the flue(s) and the base, and reduce carbonate precipitation as a result of better thermal balance.

Many modifications to the disclosed embodiments are contemplated. For example, although the top inlet according to this invention confers many benefits when used in a gas-fired commercial water heater, it can be used in any residential water heater as well, heated by any available heat source. Also, the optional end constriction embodiment illustrated in FIG. 5 can be removed entirely or replaced with an alternative construction such as a plug that extends into the conduit, an inwardly bent wall portion of the conduit itself, a twisted end portion of the conduit that defines a constricted outlet diameter, or a welded or otherwise attached component that extends the conduit and positions the constricted opening adjacent to the conduits distal end. In some circumstances it may even prove desirable to entirely close the conduit's end opening in order to direct all of the water flow radially outwardly through the wall openings.

The size and shape of the deflecting means, as well as their number, can vary widely. Although the shape illustrated in the Figures is preferred, it is believed that the surface area and angle of the preferred deflectors may be at least as effective as their shape. For example, a tab or deflector of small width W and large height H can be exchanged with a deflector of large width W and small height H. Also, a semicircular deflector with a particular surface area can be exchanged with a deflector having a different shape but a similar surface area, although surface area can be changed as well to suit a particular application. It is also contemplated that the preferred deflectors on the same conduit may differ from one another in terms of their size and/or shape.

The number of preferred deflectors that are positioned in the same plane can vary from a single deflector to 3 or 4 or more, limited only by the diameter and strength of the inlet conduit. The distance between adjacent planes may vary or remain constant if more than two planes of deflecting means are used. Also, the preferred deflectors can be provided in linear rows along the length of the inlet conduit as shown in FIG. 1, for example, or they can be staggered or helically arranged along the conduit's length. While deflectors such as tab 28 are a preferred form of deflecting means, any structure can be alternatively used so long as it is capable of deflecting water flow outwardly through openings in the inlet conduit.

Although this invention has been described with reference to specific forms selected for illustration in the drawings, and with respect to various modifications thereof, it will be appreciated that many other variations may be made without departing from the feature of reducing the generation of temperature gradients within a water heater tank. All such variations, including the substitution of equivalent elements or materials for those specifically shown and described, are within the spirit and scope of the invention as defined in the appended claims.

What is claimed is:

1. A top inlet adapted for delivering water into a water heater tank through a port defined in a top wall of said tank, said inlet comprising:

an inlet conduit having a downwardly extending flow passageway having an inside diameter of about 1¼" or larger, said inlet having a proximal portion defining a flow opening for water flow into said flow passageway, and a distal portion positioned downwardly from said proximal portion and defining an end exit opening facing toward the bottom of said tank, wherein a plurality of wall openings are defined in said conduit wall for water flow from said flow passageway;

deflector means extending within said inlet conduit and into the path of said water flow for deflecting a significant portion of said water flow outwardly through said wall openings;

said deflecting means including at least one substantially frown-shaped tab positioned downstream from and adjacent to at least one of said wall openings; and wherein said wall openings and said deflecting means for deflecting said water flow coact, as said water flow is introduced into said tank, to promote water circulation within said tank and to reduce the generation of temperature gradients within said tank.

2. The inlet defined in claim 1, wherein said inlet conduit is substantially tubular with a substantially constant flow passage through said proximal portion.

3. The inlet defined in claim 1, wherein said deflecting means for deflecting said portion of said water flow comprises at least one surface positioned substantially adjacent to and within said wall of said inlet conduit and extending at an angle from said wall toward said path of said water flow.

4. The inlet defined in claim 3, wherein said deflecting surface comprises a tab formed integrally with said wall at a position downstream from and adjacent to one of said wall openings.

5. The inlet defined in claim 4, wherein said tab extends inwardly toward a central region of said flow passageway at an acute angle with respect to said wall.

6. The inlet defined in claim 4, wherein said tab has a surface area substantially corresponding to the cross-sectional area of a corresponding one of said wall openings.

7. The inlet defined in claim 4, wherein said tab is substantially semi-circular in shape.

8. The inlet defined in claim 1, further comprising a fitting engaged over said proximal portion of said inlet conduit for forming a connection between said inlet conduit and said tank.

9. The inlet defined in claim 1, wherein said deflecting means comprises a plurality of surfaces positioned substantially adjacent to and within said wall of said inlet conduit.

10. The inlet defined in claim 9, wherein said deflecting surfaces are positioned adjacent to, and downstream from, each of said wall openings.

11. The inlet defined in claim 9, wherein at least some of said deflecting surfaces are connected to said wall in a common plane that is substantially perpendicular to said flow passageway.

12. The inlet defined in claim 9, wherein at least some of said deflecting surfaces are spaced along the length of said inlet conduit.

13. The inlet defined in claim 9, wherein said deflecting surfaces are arranged in four positions spaced along the length of said inlet conduit.

14. An inlet adapted for delivering water into a water heater tank through a port defined in a top wall of said tank, said inlet comprising:

an inlet conduit having an inside diameter of about 1¼" or larger comprising a proximal portion adapted for connection to said port and a distal portion extending from said proximal portion and positionable toward a bottom of said tank, said proximal portion and said distal portion together defining a path for water flow, and said distal portion having an end exit opening facing toward the bottom of said tank for conducting said water flow from said inlet conduit downwardly into said tank;

a plurality of flow openings defined in a wall of said inlet conduit for providing water flow from said inlet conduit and outwardly into said tank with a radial component;

a plurality of substantially frown-shaped deflectors extending within and spaced apart from one another along said inlet conduit and extending into said path of said water flow, wherein each of said deflectors is positioned adjacent to and downstream from each of said flow openings defined in said wall;

wherein said deflectors have deflecting surfaces that are arranged at angles directed to coact with said water flow to urge a significant portion of said water flow outwardly through said flow openings to promote water circulation within said tank and to reduce the generation of temperature gradients within said tank.

15. The inlet defined in claim 14, wherein said inlet conduit is substantially tubular with a substantially constant flow passage through said proximal portion.

16. The inlet defined in claim 14, wherein each of said deflectors comprises a surface positioned substantially adjacent to and within said wall of said inlet conduit and extending at an angle from said wall into said path of said water flow.

17. A water heater adapted to reduce the generation of temperature gradients that tend to occur within said water heater, said water heater comprising:

a tank having a port defined in a top wall thereof;

an inlet conduit connected for water flow into said tank, said inlet conduit having an inside diameter of about 1¼" or larger said inlet conduit comprising a proximal portion and a distal portion extending from said proximal portion having an open end facing toward the bottom of said tank for flow downwardly toward a bottom of said tank, said proximal portion and said distal portion together defining a path for said water flow, and said distal portion defining an exit end opening facing downwardly into said tank;

a plurality of flow openings defined in a wall of said inlet conduit for water flow outwardly into said tank with a radial component;

a plurality of substantially frown-shaped deflectors spaced along the length of said inlet conduit and angled at angles toward said path of said water flow, wherein said deflectors are arranged adjacent to and downstream from said flow openings for urging a significant portion of said water to flow outwardly through said flow openings; and a fitting engaging said proximal portion of said inlet conduit and connected to said port defined in said top wall of said tank;

wherein said deflectors coact with said flow openings to generate a flow pattern capable of promoting water circulation within said tank and reducing the generation of said temperature gradients within said tank.

18. The water heater defined in claim 17, wherein a dielectric insulator is positioned between said fitting and said inlet conduit.

* * * * *

UNITED STATES PATENT AND TRADEMARK OFFICE
CERTIFICATE OF CORRECTION

PATENT NO. : 5,988,117
DATED : November 23, 1999
INVENTOR(S) : Eric M. Lannes

It is certified that error appears in the above-indentified patent and that said Letters Patent is hereby corrected as shown below:

Item [73],
On the Title page, please insert the Assignee information as follows: -- Bradford White Corporation, Ambler, Pennsylvania --.

Signed and Sealed this

Twentieth Day of March, 2001

*Attest:*

NICHOLAS P. GODICI

*Attesting Officer*     *Acting Director of the United States Patent and Trademark Office*